United States Patent [19]

Laine

[11] Patent Number: 5,827,082

[45] Date of Patent: Oct. 27, 1998

[54] HINGED DEVICE

[75] Inventor: Pasi Laine, Tampere, Finland

[73] Assignee: Nokia Mobile Phones, Ltd., Helsinki, Finland

[21] Appl. No.: 763,931

[22] Filed: Dec. 12, 1996

[30] Foreign Application Priority Data

Dec. 22, 1995 [FI] Finland .................................... 956225

[51] Int. Cl.⁶ .................................................. H01R 3/00
[52] U.S. Cl. ............................................................ 439/165
[58] Field of Search ..................................... 439/165, 31

[56] References Cited

U.S. PATENT DOCUMENTS

| | | | |
|---|---|---|---|
| 4,571,456 | 2/1986 | Paulsen et al. ......................... | 179/2 C |
| 4,986,763 | 1/1991 | Boyle ..................................... | 439/165 |
| 5,007,849 | 4/1991 | Shinoda ................................. | 439/165 |
| 5,127,842 | 7/1992 | Kelly ............................... | 439/165 OR |
| 5,141,446 | 8/1992 | Ozouf et al. ..................... | 439/165 OR |
| 5,328,379 | 7/1994 | Kobayashi .............................. | 439/165 |
| 5,581,440 | 12/1996 | Toedter ............................ | 439/165 OR |
| 5,661,797 | 8/1997 | Leman et al. .................... | 379/433 OR |

FOREIGN PATENT DOCUMENTS

WO 90/10818   9/1990   WIPO .

*Primary Examiner*—Neil Abrams
*Assistant Examiner*—Daniel Wittels
*Attorney, Agent, or Firm*—Perman & Green, LLP

[57] ABSTRACT

The invention is related to a device comprising a base part (1), a pivoting part (2), and a hinge structure comprising a first pair of hinges (4, 5, 6) and a second pair of hinges (8, 9, 10), the hinge structure being used to pivotally mount the pivoting part on the base part, and electric connection means (12, 13) between the base part and the pivoting part, whereby a connecting piece (3) is provided between the first pair of hinges (4, 5, 6) and the second pair of hinges (8, 9, 10), the electric connection means (12, 13) having been taken through the connecting piece, and the connecting piece being mounted to partly pivot along with the pivoting part (2), the slewing angle β of the connecting piece being smaller than the slewing angle α of the hinge.

10 Claims, 5 Drawing Sheets

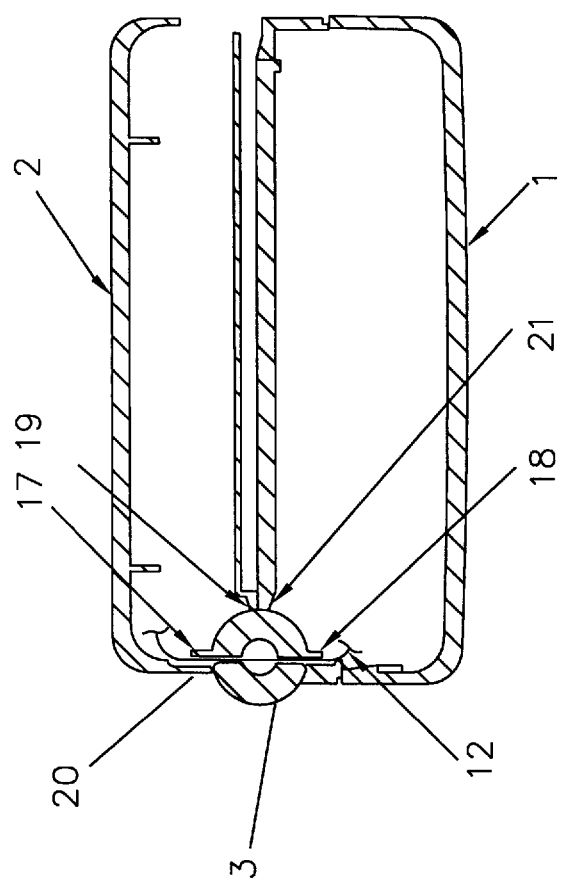

HINGED DEVICE

BACKGROUND OF THE INVENTION

The invention is related to a device comprising a base part, a pivoting part, and a hinge structure comprising a first pair of hinges and a second pair of hinges, the hinge structure being used to pivotally mount the pivoting part on the base part; and an electric connection means between the base part and the pivoting part.

U.S. Pat. publication 4,571,456 discloses a portable computer according to the appended FIGS. 4a and 4b, comprising base part 22, display unit 23, and cable 24 between the base part and the display unit. Display unit 23 is pivotally mounted on base part 22 by hinge structure 25. Cable 24 travels through the hinge in the direction of the hinge line, whereby, when the display unit is opened and closed, torsion is exerted on the cable to the extent of the spread angle of the display unit, causing stress on the cable. This structure is only applicable for round cables but not for, e.g., flat cables which require a larger space. Another disadvantage of this known device is that it is difficult to disassemble and reassemble for maintenance.

Publication WO-90/10818 discloses a portable computer comprising a base part and a display unit pivotally mounted on the base part, and a flat cable between the base part and the display unit. In this solution, the specially built flat cable travels inside a split pivot pin in the direction of the hinge line. At the entry point of the flat cable, there is provided an extra length of loose cable which enables the cable to wind around the pivot pin when the hinge is pivoted.

Organizer-type devices employ a hinge structure in which the input opening of the cables is implemented perpendicular to the hinge line, whereby the bending radius of the cables are small and the bending angle is as large as the spread angle of the device. This may cause stress on the cables, and furthermore, the cables must be provided with an extra length of loose cable.

The object of the invention is to provide a device comprising a hinge structure for cable input openings which avoids the disadvantages of the above-mentioned known solutions, and which is simple in structure and easy to assemble and disassemble. Thus, the object of the invention is particularly to provide a hinge structure that is well-adapted for input openings of different types of cables, including flat cables, and in which the stress exerted on the cables is small.

These objects are achieved with the device according to the invention, the main features thereof being apparent from the appended Claims.

SUMMARY OF THE INVENTION

Consequently, the invention comprises a device comprising a base part, a pivoting part, and a hinge structure comprising a first pair of hinges and a second pair of hinges, the hinge structure being used to pivotally mount the pivoting part on the base part, and electric connection means between the base part and the pivoting part, the device being characterised in that a connecting piece is provided between the first pair of hinges and the second pair of hinges, through which the electric connection means are taken and which is adapted to partly pivot along with the pivoting part, the swing angle $\beta$ of the connecting piece being smaller than the swing angle $\alpha$ of the hinge, i.e., the spread angle of the device.

According to a preferred embodiment, the said connecting piece comprises a member that allows the connecting piece to partly swing along with the pivoting part. This member may comprise a projecting part on the outer surface of the connecting piece, whereby the pivoting part comprises stops for the projecting part, respectively.

The connecting piece may also comprise another projecting part, whereby the base part, correspondingly, is provided with a stop for the second projecting part for restricting the swinging of the pivoting part and for keeping the pivoting part at a desired angle $\alpha$ with respect to the base part.

The connecting piece is preferably an elongated cylindrical piece.

The electric connection means, such as flat cables and/or round cables, can be taken through the connecting piece perpendicularly or obliquely with respect to the slewing axis.

Each said pair of hinges may comprise a hinge sleeve attached to the base part and a hinge sleeve attached to the pivoting part, and a pivot pin that connects the two, whereby holes are provided at both ends of the connecting piece. Thus the pivot pins extend into the holes and keep the connecting piece in place between the pairs of hinges. A spring(s) can also be provided to press the connecting piece in place between the pairs of hinges.

As described above, the swing angle $\beta$ of the pivoting connecting piece in the device according to the invention is smaller than the swing angle $\alpha$ of the hinge, i.e., the spread angle of the device. The smaller spread angle allows less stress on the cables. Consequently, the bending radius of the cables can be increased and the bending angle decreased by using the pivoting connecting piece. In addition, the diameter of the hinge becomes small. These matters are of importance since coaxial cables, for instance, do not tolerate sharp angles.

The size of the spread angle $\alpha$ of the device according to the invention is directly proportional to the diameter of the hinge, i.e., the connecting piece.

The device according to the invention can be, e.g., a PDA device, in other words, a dual-purpose data transmission device with two separate user interfaces. The first user interface is essentially similar to the presently well-known user interface of a mobile phone. It is placed on the outer surface of the device and preferably comprises a speaker, a microphone, a numeric keypad, and a fairly small display. To use the second user interface, this so-called dual-purpose data transmission device is opened with the aid of the said pivoting, hinged part, whereby a large display and a full alphanumeric keyboard, the so-called QWERTY keyboard, are exposed from the inside of the device. The intention is that, with the aid of the first user interface, the device can be used in the same manner as an ordinary mobile phone of a cellular network, whereby the device can be kept closed and it is easy to handle because of its compact shape and small size. The second user interface can be used to transmit and receive textual and graphical messages, intercomputer data messages, and telefax messages, and to use the notepad or calendar functions, and possible additional functions such as the pocket calculator program, the electronic dictionary, and so on. The user interfaces of the device can be used both independently and simultaneously, i.e., in the middle of a telephone call, the user can open the device and check an agreed appointment on the calendar or write an important piece of information on the notepad.

In addition to the dual-purpose data transmission device described above, the device according to the invention may be any device consisting of two or more parts, such as laptop- and palmtop-type computers. The parts should be joined by a hinge to decrease the size, and connected by cables to provide an electric connection.

BRIEF DESCRIPTION OF THE DRAWINGS

In the following, the invention is described in detail with reference to the appended drawings in which:

FIG. 3 presents the device of FIG. 2 in the closed position,

Figure 1:
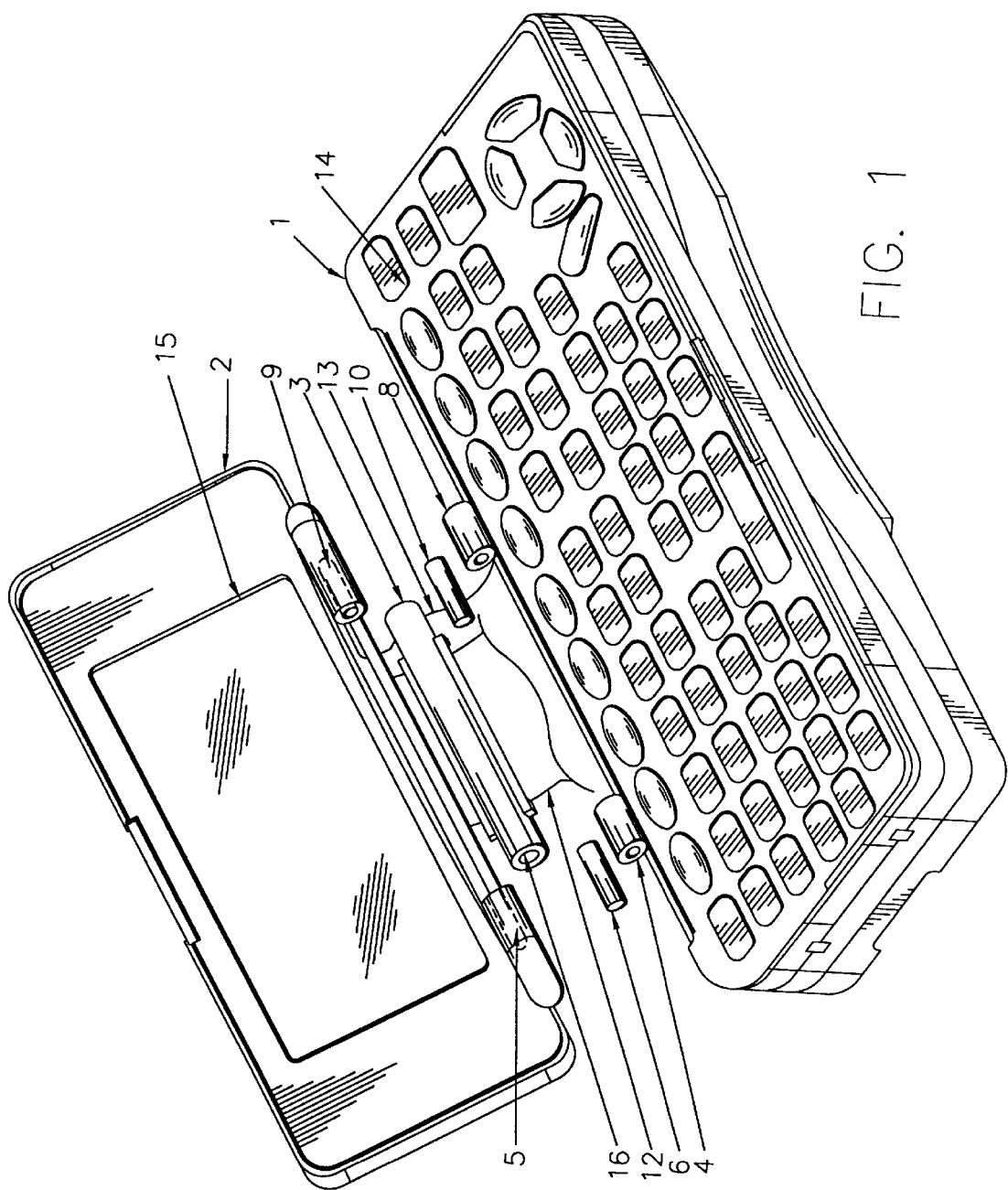
FIG. 1 is an exploded view of a PDA device according to the invention.
Figure 2:
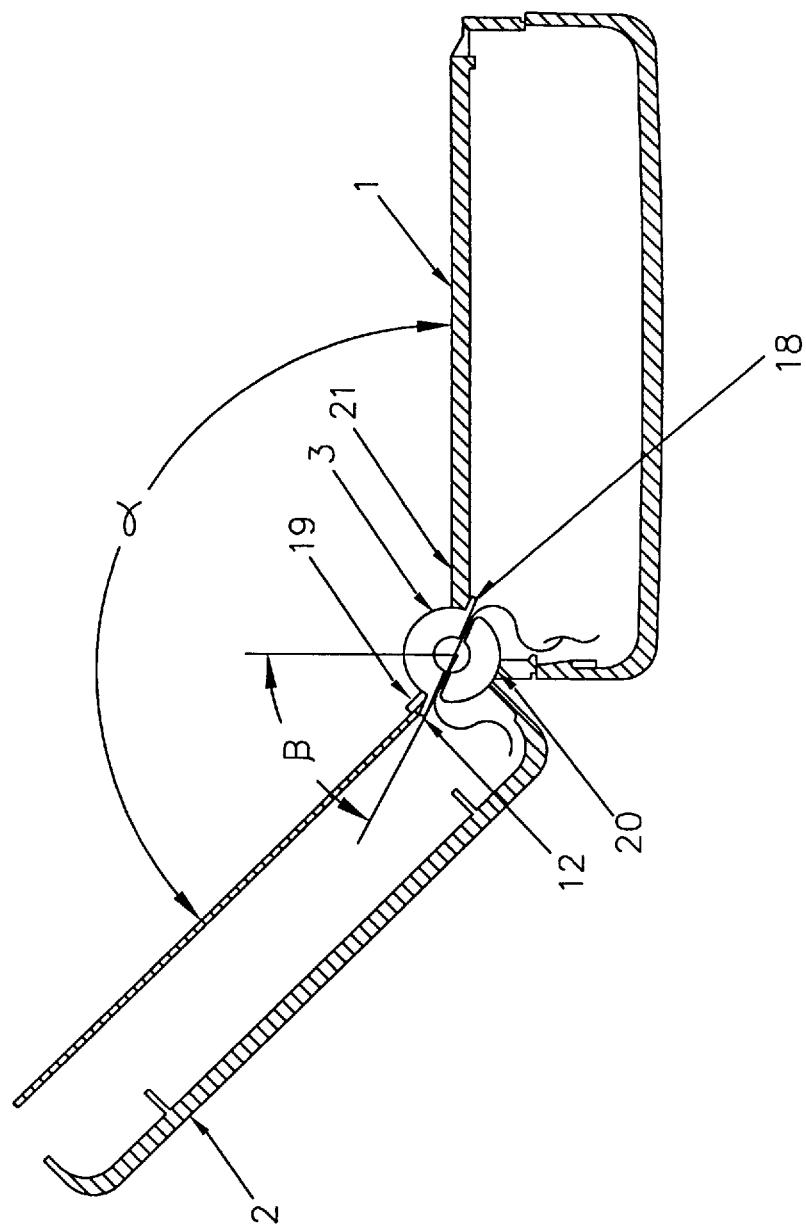
FIG. 2 is a cross-section of the device of FIG. 1 in the opened position.
Figure 4A:
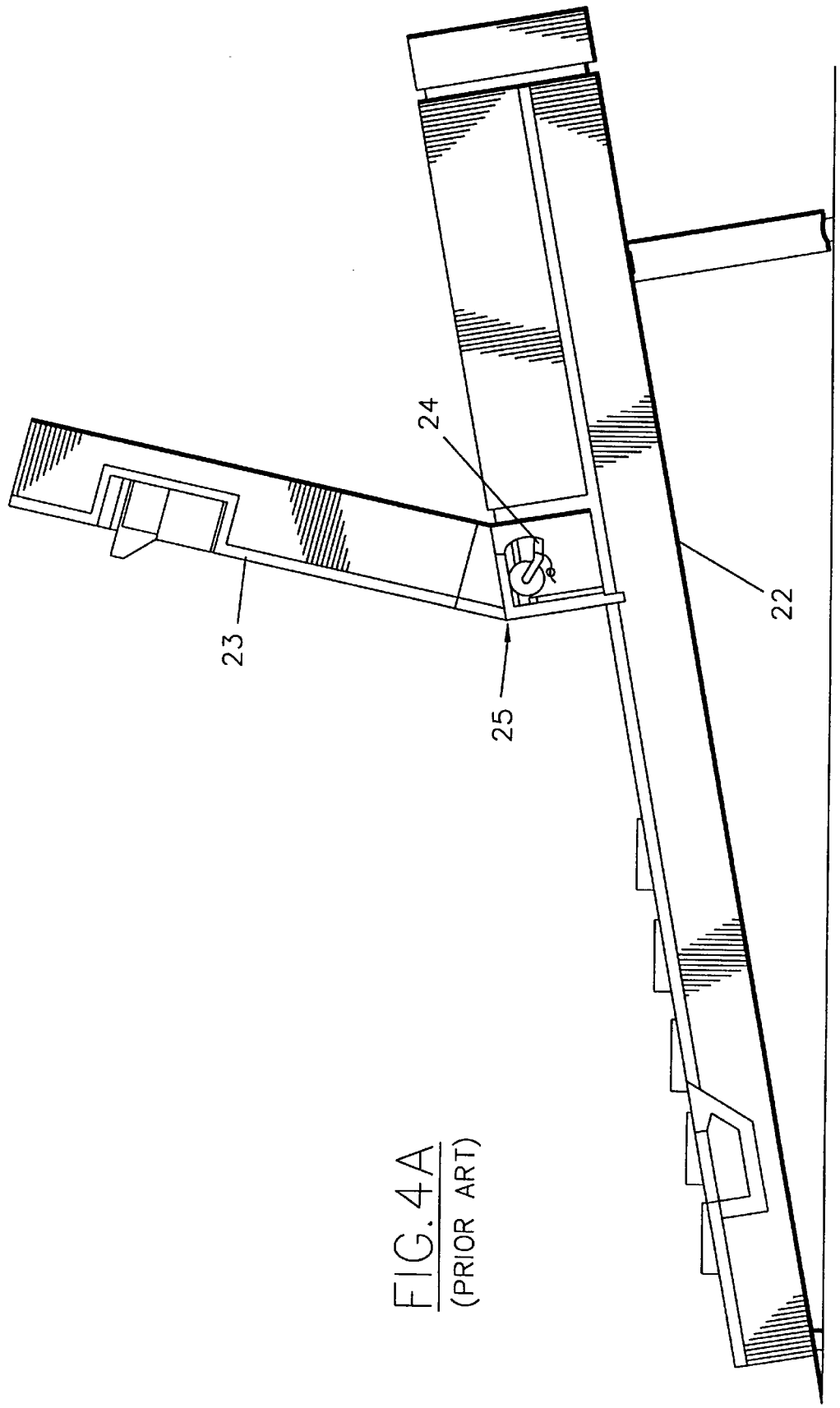
FIG. 4a presents a prior art device.
Figure 4B:
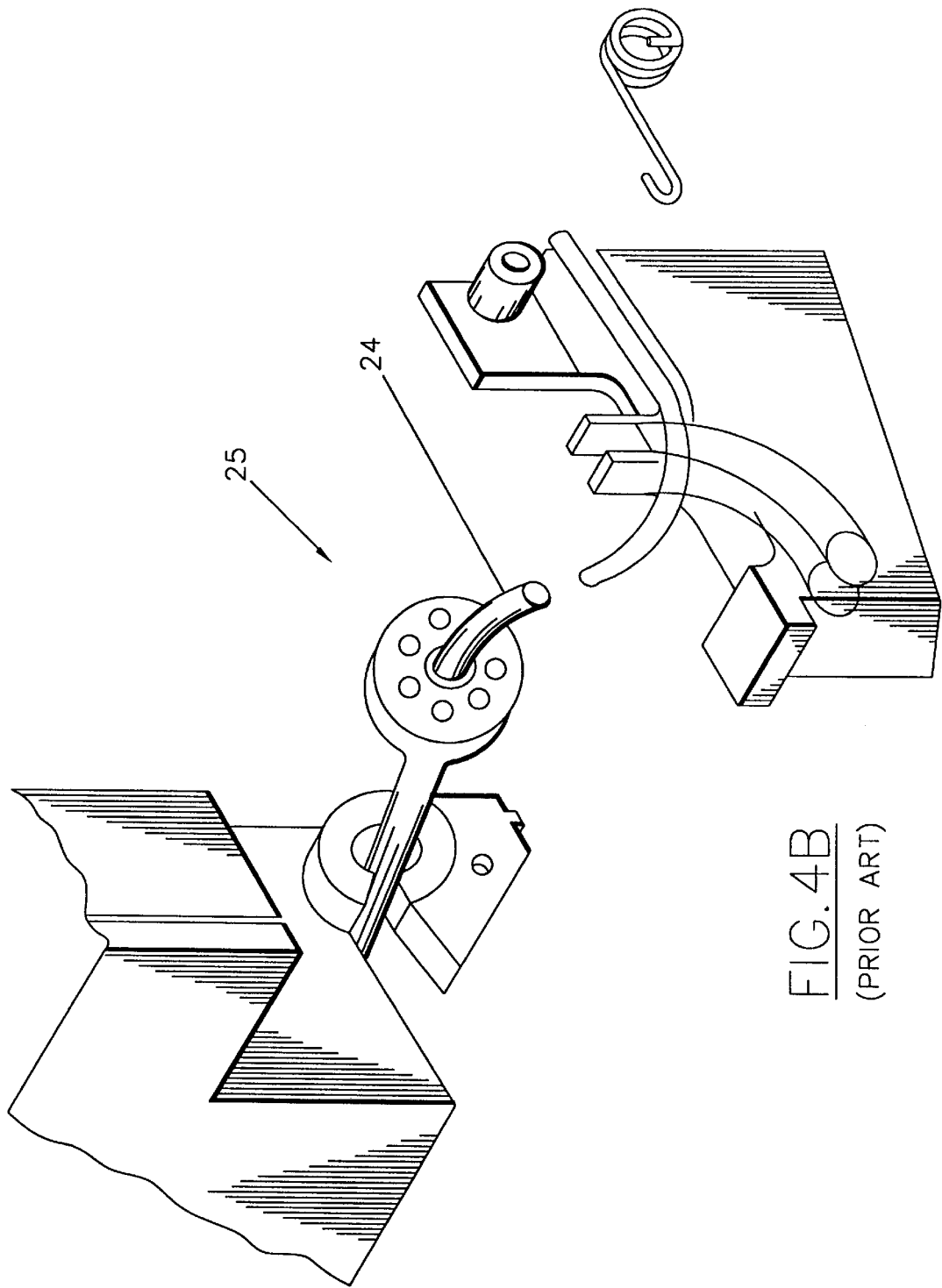
FIG. 4b presents a detail of the device in FIG. 4a in a larger scale.

In connection with the prior art description above, a reference was made to FIGS. 4a and 4b, therefore, FIGS. 1–3 will be referred to in the following description of the invention and the preferred embodiments thereof. The base part of the PDA device presented in FIGS. 1–3 is marked reference number 1. A first user interface (not shown in the figures) is provided on the outer surface of base part 1. This interface can be the same as those in known mobile phones. Keyboard 14 of the second user interface is provided on the opposite outer surface of base part 1. Cover part 2 which is provided with display 15 of the second user interface is pivotally mounted on the long side of base part 1 by using a hinge structure comprising a first pair of hinges and a second pair of hinges. The first pair of hinges consists of hinge sleeve 4 attached to base part 1, hinge sleeve 5 attached to cover part 2, and pivot pin 6 connecting the two, and helical spring 7. The second pair of hinges correspondingly consist of hinge sleeve 8 attached to base part 1, hinge sleeve 9 attached to cover part 2, and pivot pin 10 connecting the two, and of helical spring 11.

An elongated, cylindrical, pivotal connecting piece 3 is provided between the first and the second pair of hinges, provided with holes 16 at the ends thereof. The said pivot pins are pushed into the holes, keeping the connecting piece 3 in place between hinge sleeves 4 and 8.

Connecting piece 3 comprises a slot for flat cable 12, and a hole for RF cable 13. Flat cable 12 and RF cable 13 each travel through connecting piece 3 essentially perpendicular to the slewing axis.

The outer surface of cylindrical connecting piece 3 is provided with two axial projections 17 and 18 which are placed essentially diametrally to each other. Cover part 2 is provided with stops 19 and 20 for projection 17, and base part 1 is provided with stop 21 for projection 18. The projections and stops and the diameter of the connecting piece together determine spread angle a of the cover part and slewing angle β of the connecting piece.

Referring to FIGS. 2 and 3, cover part 2 turns from the closed position, when the device is opened, to the extent of a certain angle while connecting piece 3 as well as cables 12 and 13 remain fixed. The angle may be, e.g., about 90°, but it is obvious that it can also be something else. Thereafter, stop 19 meets projection 17, whereby connecting piece 3 turns along with the cover part until projection 18 meets stop 21. By this time the connecting piece has turned to the extent of angle β and the cover part has turned to the extent of angle α, and the device is in its operational position (FIG. 2).

When the device is closed, cover part 2 turns to the extent of a certain angle while connecting piece 3 remains fixed. Thereafter, stop 20 meets projection 17, whereby connecting piece 3 turns along with cover part 2 until the device is closed (FIG. 3). Cables 12 and 13 move and are exposed to bending only when connecting piece 3 is turned.

Only one preferred embodiment of the invention is described above and it is obvious that many modifications are possible within the appended Claims.

I claim:

1. A device comprising a base part (1), a pivoting part (2) pivoting through a given slewing angle α relative to said base part, and a hinge structure comprising a first pair of hinges (4, 5, 6) and a second pair of hinges (8, 9, 10), the hinge structure being used to pivotally mount the pivoting part on the base part, and electric connection means (12, 13) between the base part and the pivoting part, characterised in that a connecting piece (3) is provided between the first pair of hinges (4, 5, 6) and the second pair of hinges (8, 9, 10), said connecting piece pivoting through a given slewing angle β, the electric connection means (12, 13) having been taken through the connecting piece, and the connecting piece being adapted to partly pivot along with the pivoting part (2), the slewing angle β of the connecting piece being smaller than the slewing angle α of the pivoting part.

2. A device according to claim 1, characterised in that the connecting piece (3) is provided with a member (17) which allows the connecting piece to partly pivot along with the pivoting part (2).

3. A device according to claim 2, characterised in that the said member comprises a projection (17) on the outer surface of the connecting piece (3) and that the pivoting part (2) is provided with stops (19, 20) for the projection.

4. A device according to claim 3, characterised in that the connecting piece (3) is further provided with a second projection (18) and that the base part (1) is provided with a stop (21) for the second projection to restrict the pivoting of the pivoting part (2) and to keep the pivoting part (2) in a desired angle α with respect to the base part (1).

5. A device according to claim 1, characterised in that the connecting piece (3) is an elongated cylindrical body.

6. A device according to claim 1, characterised in that the electric connection means (12, 13) have been taken through the connecting piece (3) perpendicularly or obliquely to the slewing axis.

7. A device according to claim 6, characterised in that the electric connection means (12, 13) only move when the connecting piece (3) is moved.

8. A device according to claim 1, characterised in that each pair of hinges (4, 5, 6; 8, 9, 10) comprises a hinge sleeve (4; 8) attached to the base part (1) and a hinge sleeve (5; 9) attached to the pivoting part (2), and a pivot pin (6; 10) connecting the two.

9. A device according to claim 8, characterised in that the connecting piece (3) comprises holes (16) at both ends thereof and that the pivot pins (6, 10) extend into the holes, keeping the connecting piece in place between the pairs of hinges.

10. A device according to claim 8, characterised in that spring force is used to keep the connecting piece in place between the pairs of hinges.

* * * * *